United States Patent [19]
Altvater et al.

[11] Patent Number: 5,875,184
[45] Date of Patent: Feb. 23, 1999

[54] METHOD FOR TRANSFERRING DATA PACKETS

[75] Inventors: Ulrich Altvater; Stefan Böhmer, both of Bad Rappenau, Germany

[73] Assignee: Altvater Air Data Systems GmbH & Co.KG, Germany

[21] Appl. No.: 769,509

[22] Filed: Dec. 19, 1996

[51] Int. Cl.⁶ ..................................................... H04J 3/16
[52] U.S. Cl. .................... 370/330; 370/337; 370/349; 455/452; 375/202
[58] Field of Search ...................... 370/330, 337, 370/349, 350, 436, 478, 203, 206, 347; 375/202; 455/450, 451, 452

[56] References Cited

U.S. PATENT DOCUMENTS

| | | | |
|---|---|---|---|
| 3,700,820 | 10/1972 | Blasbalg et al. | 370/468 |
| 5,142,534 | 8/1992 | Simpson et al. | 370/330 |
| 5,260,944 | 11/1993 | Tomabechi | 370/347 |
| 5,311,504 | 5/1994 | Colamonico | 370/330 |
| 5,349,580 | 9/1994 | Hester et al. | 370/461 |
| 5,386,435 | 1/1995 | Cooper et al. | 375/202 |
| 5,425,049 | 6/1995 | Dent | 375/202 |
| 5,521,925 | 5/1996 | Merakos et al. | 370/337 |

FOREIGN PATENT DOCUMENTS

| | | |
|---|---|---|
| 0 523 362 A2 | 6/1992 | European Pat. Off. . |
| 44 03 483 A1 | 2/1994 | Germany . |
| 44 25 973 C1 | 7/1994 | Germany . |
| 44 34 041 C1 | 9/1994 | Germany . |
| 44 07 544 A1 | 9/1995 | Germany . |
| 196 17 301 A1 | 4/1996 | Germany . |

OTHER PUBLICATIONS

Halsall, F., Data Communications, Computer Networks and Open Systems, pp. 330–331, 1995.

*Primary Examiner*—Alpus H. Hsu
*Assistant Examiner*—W. Todd Baker
*Attorney, Agent, or Firm*—Knobbe, Martens, Olson & Bear, LLP

[57] ABSTRACT

A method for transferring data packets in a network of user stations is described, the data packets being transferred over a set of channels with the frequency-hopping method and the channels being in this context selected for data transfer in accordance with a frequency-hopping pattern in temporally successive time slots. Time slots in which a user station is authorized to transmit are assigned to it as needed.

15 Claims, 5 Drawing Sheets

| t | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | ... | 79 |
|---|---|---|---|---|---|---|---|---|---|---|----|----|----|----|----|----|----|----|----|----|----|----|----|----|----|----|-----|----|
| S1V | x |   |   |   |   | x |   |   |   |   | x |   |   |   |   |   |   |   |   |   | x |   |   |   |   |   |   |   |
| S1D |   |   |   | x |   | x |   |   |   |   |   |   |   |   |   |   |   | x |   |   | x |   |   |   |   |   |   |   |
| S3V |   |   |   |   |   |   |   | x |   |   |   |   |   |   |   | x |   |   |   |   |   |   |   |   |   | x |   |   |
| S3D |   |   |   |   |   |   |   |   |   |   | x |   |   |   |   |   |   |   |   |   |   |   |   |   |   | x |   |   |

METHOD FOR TRANSFERRING DATA PACKETS

BACKGROUND OF THE INVENTION

1. Field of the Invention

The present invention relates to a method for transferring data packets in a network of user stations, the data packets being transferred over a set of channels with the frequency-hopping method and the channels being in this context selected for data transfer in accordance with a frequency-hopping pattern in temporally successive time slots, and there being assigned to a user station time slots in which it is authorized to transmit.

2. Related Art

A method of this kind is known from DE 44 07 544 A1.

The known method is used to transfer data packets in an auxiliary network which transmits via frequency channels that are at least in part already used in an existing basic network for digital data and/or voice transfer. With this method, in a first step a frequency channel not currently occupied by the basic network is identified, whereupon in a second step a data packet is transferred over the identified frequency channel. These steps are repeated, using frequency-hopping technology, until all the data packets of a transmission have been transferred.

With the known method, by using frequency-hopping technology it is possible to utilize existing channels better without disturbing the respective basic network.

As is common in frequency-hopping technology, the individual data packets are transferred, in accordance with a frequency-hopping pattern, in temporally staggered time slots over various frequency channels, the load being evenly distributed among the available channels.

The underlying frequency-hopping table is in this instance generated pseudo-randomly, the target address being incorporated into the channel calculation. In a specific time slot, only one specific user station is addressed over the particular channel, the assignment of the channels to the user stations being thereby predefined.

With this method, the selection of a frequency channel not currently occupied by the basic network takes place in such a way that one of the multiple frequency channels is first selected, whereupon this selected channel is then listened in on to check whether the basic network is currently transmitting on that frequency channel. If no signal is received during this listening-in process, it is assumed that this channel can be used by the auxiliary network.

If it is found, however, that the selected channel is currently being used by a primary user, the time slot elapses unused, i.e. no data packet is transferred over the selected channel so as not to disrupt the primary user.

It is apparent from the above that with the known method, transmission authorization is permanently allocated to the user stations, so that the number of user stations governs how often a user station can transmit within a specific time span. If some of the user stations have no need to transmit, data throughput with the known method can therefore be greatly reduced due to the unused elapsed time slots.

The assignment of the individual channels of the frequency-hopping pattern to the respective user stations therefore depends on the number of user stations. If their number increases or decreases, the data throughput of an individual user station rises or falls correspondingly.

In addition to the non-optimum data throughput already mentioned above which occurs under certain network conditions, the known method thus has the further disadvantage that data transfer is not always possible in real time. The time intervals in which a user station can transfer its data packets depend greatly on the configuration of the network of user stations.

SUMMARY OF THE INVENTION

In view of the above, it is an object of the present invention to improve the method mentioned at the outset in such a way that data throughput in the network of user stations is maximized, and data transfer in real time becomes possible.

According to the invention, this object is achieved with the method mentioned at the outset by the fact that the time slots are assigned to the user stations as needed, based on requirement.

The object underlying the invention is thereby completely achieved.

A central station for a network of user stations which transfers data packets, such that the data packets are transferred over a set of channels with the frequency-hopping method and the channels are in that context selected for data transfer in accordance with a frequency-hopping pattern in temporal succession, is correspondingly characterized, according to the invention, in that the central station has a first transmission/reception section which processes a first frequency-hopping pattern in order to transfer data packets in load-dependent fashion to/from the user stations.

Correspondingly, a user station for a network of such user stations which transfers data packets, such that the data packets are transferred over a set of channels with the frequency-hopping method and the channels are in that context selected for data transfer in accordance with a frequency-hopping pattern in temporal succession, is characterized according to the invention in that the user station is equipped to store a first frequency-hopping pattern and process it as specified by a central station.

The central station and user station thus process the same frequency-hopping pattern, the central station allocating the transmission authorization in each case as needed, i.e. on a load-dependent basis for asynchronous data transfer and with a fixed time pattern for synchronous data transfer.

The reason is that if the time slots are allocated to the user stations as needed, in other words for example on a load-dependent basis, it is on the one hand possible to react flexibly to fluctuating network load conditions. A user station that currently has a high transfer requirement thus receives more time slots assigned to it than other user stations which have no data or very little data to transfer per unit time. This is possible, surprisingly, because channels are not only (as in the related art) allocated to the user stations from the frequency-hopping pattern, but rather time slots are allocated to the user stations, the particular channels to be used for transfer being defined by the frequency-hopping pattern. The frequency-hopping pattern itself can be, for example, static, or can be managed dynamically by the primary users based on channel occupancy. This can occur, however, independently of the dynamic allocation of time slots to the user stations.

It is further preferred in this context if at least a first, fixed time grid of periodically arranged time slots is assigned to a user station for the synchronous transfer of data packets, and at least some of the remaining time slots are allocated dynamically to the user stations as a function of their data volume.

It is further advantageous here that now both synchronous and asynchronous data transfer are possible by means of one and the same frequency-hopping pattern. A user station that wishes to transfer, for example, voice, has a fixed grid of time slots allocated to it, the assigned channels once again being defined by the particular current frequency-hopping pattern. The time slots that are still free are still assigned dynamically, i.e. in load-dependent fashion. This now on the one hand allows voice transfer, while on the other hand data throughput in the remaining time slots is maximized, since only a few of at least the remaining time slots elapse unused.

On the other hand it is preferred if in a first frequency-hopping pattern data packets are transferred as needed, and in at least one second frequency-hopping pattern orthogonal to the first frequency-hopping pattern, data packets are transferred in a predefinable time grid, synchronously in the network.

Specifically, the inventors of the present application have recognized that, surprisingly, two different types of data transfer can occur between the same user stations and over the same set of channels, so that on the one hand data throughput is maximized, and on the other hand data transfer in real time is possible.

Asynchronous data transfer with optionally load-dependent, i.e. dynamic, allocation of transmission authorization ensures optimization of data throughput, specifically because user stations uninterested in a data transfer can temporarily occupy only a few (or no) time slots and therefore channels in the first frequency-hopping pattern, while a greater number of channels in the frequency-hopping pattern can be allocated to user stations with high data traffic. Under certain network conditions, synchronous data transfer can of course also take place here. A purely dynamic allocation of transmission authority of this kind does not, however, allow continuous synchronous data transfer, since user stations with a fluctuating data volume would ensure that a user station which wishes to carry out synchronous traffic would be allocated time slots at differing time intervals. This would result, for example in the case of a voice transfer, in a "stutter" effect.

The inventors of the present application have recognized, however, that with the use, in accordance with the invention, of the second frequency-hopping pattern, synchronous data traffic —in which the data packets are transferred in a fixed time grid, i.e. the spacing of the allocated time slots is constant—is nevertheless also possible alongside load-dependent allocation of transmission authorization. The said spacing is predefinable, i.e. it can be adapted to how much data is to be transferred, or how often. Specifically, it might be said that two networks are operated between the same user stations and over the same channels, provision being made (by way of features yet to be described) for the network optimized in load-dependent fashion not to impair the other network for synchronous data traffic.

The orthogonal frequency-hopping pattern moreover also prevents mutual disruption due to interference. The term "orthogonal" is understood here to mean that within each time slot, the two frequency-hopping patterns always have different channels, so that mutual interference cannot occur even if there is a single transmitter on both networks within a time slot.

The frequency-hopping patterns can be either stored statically in frequency-hopping tables, or calculated dynamically by means of an algorithm. "Frequency-hopping pattern" is hereinafter always understood to mean both a statically stored frequency-hopping table and a corresponding algorithm.

The new method can be implemented, for example, by the fact that each user station has one transmission/reception section for the first frequency-hopping pattern as well as a second transmission/reception section for the second frequency-hopping pattern. A user station can, however, handle only one data packet at a time, so that in the event of a collision, priority is given to the data packet that is being transferred over the channel from the second frequency-hopping pattern, so that synchronization is not lost. It may happen, however, that data packets that are to be transferred over a channel of the first frequency-hopping pattern, to or from the user station that is currently transmitting or receiving a synchronous data packet, get lost. As is common in frequency-hopping technology, however, a receipt confirmation from the target station is expected by the transmitting station within one time slot, so that a lost data packet is noted and is repeated in the next available time slot.

A user station can moreover carry out, for example, both asynchronous and synchronous data traffic in temporally staggered fashion, the time slots between the permanently assigned time slots for synchronous data traffic being also used, depending on the load, by other user stations. If multiple user stations are carrying out synchronous data traffic, this takes place in grids of time slots that are temporally offset but each fixed, the free time slots again being available for asynchronous data traffic.

While the channels in the first frequency-hopping pattern are allocated dynamically to the user stations in order to be able to react to load changes, the assignment of the channels in the second frequency-hopping pattern can be static or variable so that real-time data transfers with different data volumes can also be carried out.

Accordingly, it is preferred in the case of the new central station if it has a second transmission/reception section that processes, approximately simultaneously, a second frequency-hopping pattern orthogonal to the first in order to transfer data packets in a predefinable time grid.

It is consequently preferred in the case of the new user station if it is equipped to store two frequency-hopping patterns and call them up selectively in order to transfer a data packet, data packets being transferred in load-dependent fashion in the first frequency-hopping pattern and data packets being transferred in a predefinable time grid in the second frequency-hopping pattern orthogonal to the first.

The advantage here is that with the new user station only a few further modifications are needed: it must simply store two frequency-hopping patterns and be able to switch from the one frequency-hopping pattern to the other. The new central station, on the other hand, is constructed in simple fashion from two transmission/reception sections, preferably identical to one another, of which one continuously follows the first frequency-hopping pattern and the other continuously follows the second. Since the two frequency-hopping patterns are orthogonal to one another, it is entirely possible for one user station to transfer synchronous data and the other user station asynchronous data; the central station then gives priority to the synchronously transferred data in downline processing, and the asynchronously transferred data are lost, i.e. must be transferred again in one of the subsequent time slots. If no synchronous data transfer is occurring, however, a simultaneously transferred data packet from the asynchronous transfer is processed by the central station. Thus, however, time slots go to the synchronous data transfer only when it is actually taking place. During pauses in conversation, in which no data packets need to be transferred despite the existence of a voice connection, the new system thus uses the time slot for an asynchronous data transfer, so that maximum optimization of data throughput is achieved here.

In general, it is preferred in this instance if the set of channels lies in a frequency band that is used by primary users, such that before a potential data transfer, a particular channel selected by the network of user stations is checked to determine whether a primary user is occupying that channel at the time, and as a function of that check either a data packet is transferred over the selected channel, or the next channel in the particular frequency-hopping pattern is selected for checking and potential data transfer.

The advantage here is that the new method can be used in conjunction with the overlay method known from DE 44 07 544 A1 cited above. A large number of frequency bands that are already being otherwise used is thus available. The inventor of the present application has, specifically, recognized that utilization of the channels by the primary users is generally so low that an overlay network can be operated without either disruption to the primary user or insufficient data throughput in the overlay network. Occupation of the channels by the primary users is in fact so low that despite the check using the "listen before talking" method described above, as a rule very few time slots are not available for data transfer, i.e. can negatively influence the quality of a real-time transfer.

In particularly advantageous fashion, the new method can be used in conjunction with a method for dynamic management of the frequency-hopping pattern that is the subject of the concurrently submitted patent application "Method for operating a network of secondary users" (Attorney file no.: 1006P104; Applicant: Altvater Air Data Systems GmbH & Co. KG). In the method described therein, channels on which primary users are transmitting not just temporarily but for a longer period are removed from the frequency-hopping pattern, so that only those channels which are actually predominantly available for data transfer are cyclically processed. This adaptation of the frequency-hopping pattern to the current occupancy situation of the channels by the primary users occurs in a central station which reports the respective new frequency-hopping pattern to the user stations.

Of course it is also possible with the method described therein to adaptively match two frequency-hopping patterns to the occupancy of the channels by primary users, and moreover to ensure that the modified frequency-hopping patterns are always orthogonal to one another.

In general it is preferred if the time slots of the first frequency-hopping pattern are dynamically allocated to the user stations as a function of their data volume.

The advantage here is that a simple, load-dependent allocation of time slots and of assigned channels results. A user station with a higher data volume has more time slots—and therefore also corresponding channels from the first frequency-hopping pattern—allocated to it than a user station with a low data volume or none at all.

It is further preferred if the network of user stations has a common system time, and processes both frequency-hopping patterns cyclically and simultaneously in such a way that in one specific time slot, one channel each from the first and second frequency-hopping patterns is available for data transfer; it is preferable if fixed, periodically arranged time slots are allocated to each user station in the second frequency-hopping pattern, or a set of fixed, periodically arranged time slots in the second frequency-hopping pattern is allocated to a user station as needed.

The advantage here is that both frequency-hopping patterns are processed, so to speak, synchronously with one another, so that in each time slot a user station that is currently authorized to transmit can transfer either an asynchronous data packet over the current channel from the first frequency-hopping pattern, or a synchronous data packet in the current channel from the second frequency-hopping pattern. Because of the dynamic allocation of channels or time slots in the first frequency-hopping pattern, the user station authorized to transmit may be able transfer an asynchronous data packet but not a synchronous one, since the current time slot is not one of the set of time slots assigned, permanently or variably as needed, in the second frequency-hopping pattern.

In other words, as a rule the user stations process the channels from the first frequency-hopping pattern, and a synchronous data packet can be transferred only if the current time slot matches the fixed set of channels in the second frequency-hopping pattern assigned to that user station.

In the first alternative, with the fixed assignment of time slots from the second frequency-hopping pattern, the respective time slot elapses unused if the user station has no synchronous data packet to be transferred at that time. With the second alternative, i.e. variable assignment, this assignment does not take place at all if the respective user station does not wish to transfer synchronous data packets, so that this user station can then process only channels from the first frequency-hopping pattern.

Data throughput is optimized by the network with this feature, since it further prevents "empty" time slots from occurring.

It is further preferred if one user station is a central station that has two transmission/reception sections, of which, in a specific time slot, the one is set on the assigned channel of the first frequency-hopping pattern and the other is set on the assigned channel of the second frequency-hopping pattern.

This feature is of particular advantage in the case of a hierarchical network, since the central station can thus transmit or receive both asynchronous and synchronous data packets at any point in time in a potential data transfer. In hierarchical networks, data traffic as a rule always occurs between two user stations via the central station, so that a user station with transmission authorization always transfers its data packet to the central station. Since the central station now can receive both synchronous and asynchronous data, no further coordination between the user station with transmission authorization and the central station is required, so that this also increases data throughput in the network.

In this connection, each user station preferably has a transmission/reception section that is set alternatively on a channel from the first or the second frequency-hopping pattern.

The advantage here is that the user stations can be of much simpler design than the central station. The user station must simply be capable of managing both frequency-hopping patterns.

It is further preferred if the user station follows the first frequency-hopping pattern, and switches over to the second frequency-hopping pattern only when it has its own transmission authorization.

The advantage here is that the user station switches its transmission/reception section onto a channel from the second frequency-hopping pattern only if it is also authorized to transmit over that channel. As has already been mentioned above, this transmission authorization can be permanently defined or selectively assigned. At other times the user station follows the first frequency-hopping pattern, and with appropriate allocation can transfer asynchronous data packets at any time.

It is further preferred in this context if the user station switches over to the second frequency spectrum only if a synchronous data transfer for it is pending.

The advantage here is that the number of unused time slots is further reduced; only if the user station itself wishes to send out a synchronous data packet, or is expecting a synchronous data packet, does it switch over to a channel from the second frequency-hopping pattern.

It is preferred in this context if the central station informs the user station of a synchronous data transfer over a channel from the first frequency-hopping pattern.

The advantage here is that the user station stays with the first frequency-hopping pattern as long as the station itself does not wish to initiate a synchronous data transfer. If a synchronous data transfer to a user station is to be performed by the central station, this fact is conveyed to the user station beforehand over a channel from the first frequency-hopping pattern, whereupon the user station then processes its permanently assigned or variably allocated set of temporally equidistant time slots.

To summarize, with the new method data packets are transferred predominantly in a load-dependent manner between the user stations and the central station; the central station assigns channels, and therefore time slots, from the first frequency-hopping pattern to the individual user stations as a function of the respective data volume. A user station with a higher data volume receives a transmission authorization over a channel more often than a user station with a low data volume. The temporal sequence of the individual allocated time slots is arbitrary.

If a synchronous data transfer, for example a voice transmission, then needs to take place for a user station, that user station must then, in an equidistant pattern of time slots that is predefined or to be predefined, continually keep re-occupying a channel from the first or the second frequency-hopping pattern. It can then transmit or receive voice over that channel. Since the time slots are equidistant, any stutter effect is avoided.

The central station is preferably designed so that it follows both the first and the second frequency-hopping pattern, i.e. in each time slot can transmit or receive both synchronously and asynchronously. This is necessary because it is not certain a priori whether a synchronous data packet will also actually be transferred over a channel from the second frequency-hopping pattern. A different user station can therefore transfer an asynchronous data packet in the same time slot, although it will be ignored by the central station if a synchronous data packet is being transferred simultaneously by another user station.

This greatly increases the overall data throughput through the network of user stations, since the channels from the second frequency-hopping pattern are actually used only when a transfer of synchronous data packets is also occurring. At all other times, a load-dependent optimized transfer of asynchronous data packets takes place over channels from the first frequency-hopping pattern.

This new method thus makes possible an optimization in the utilization of available channel capacities, even in networks in which any disruption of the primary users by the user stations must be avoided with very high reliability.

Further advantages are evident from the description and the attached drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An embodiment of the invention is shown in the drawings and will be explained further in the description below. In the drawings:

FIG. 6 shows a schematic example of frequency-hopping patterns used by the network of FIG. 5.

DETAILED DESCRIPTION OF THE PREFERRED EMBODIMENT

Figure 1:
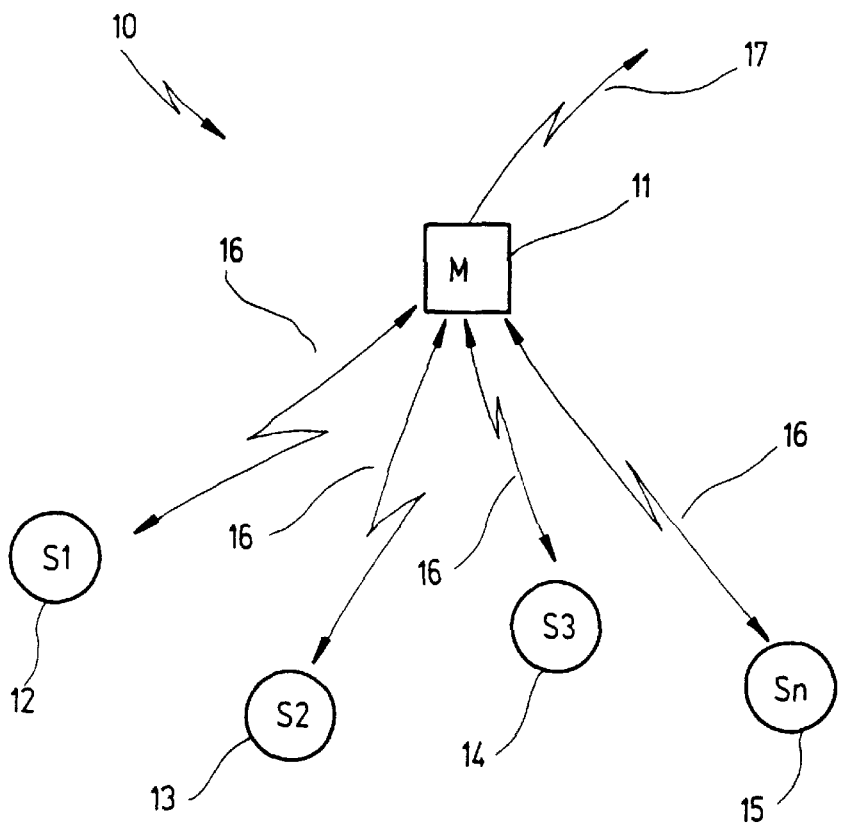
FIG. 1 shows a schematic example of a network of user stations.

FIG. 1 schematically shows a network 10 that comprises a central station 11 and multiple user stations 12, 13, 14, and 15. User stations 12, 13, 14, and 15 are connected via internal wireless links 16 to central station 11, which in turn is connected via an external wireless link 17 to further stations.

Network 10 is hierarchically structured: user stations 12, 13, 14, and 15 can communicate with one another only via central station 11. Contact with further external stations also takes place via central station 11.

Figure 2:
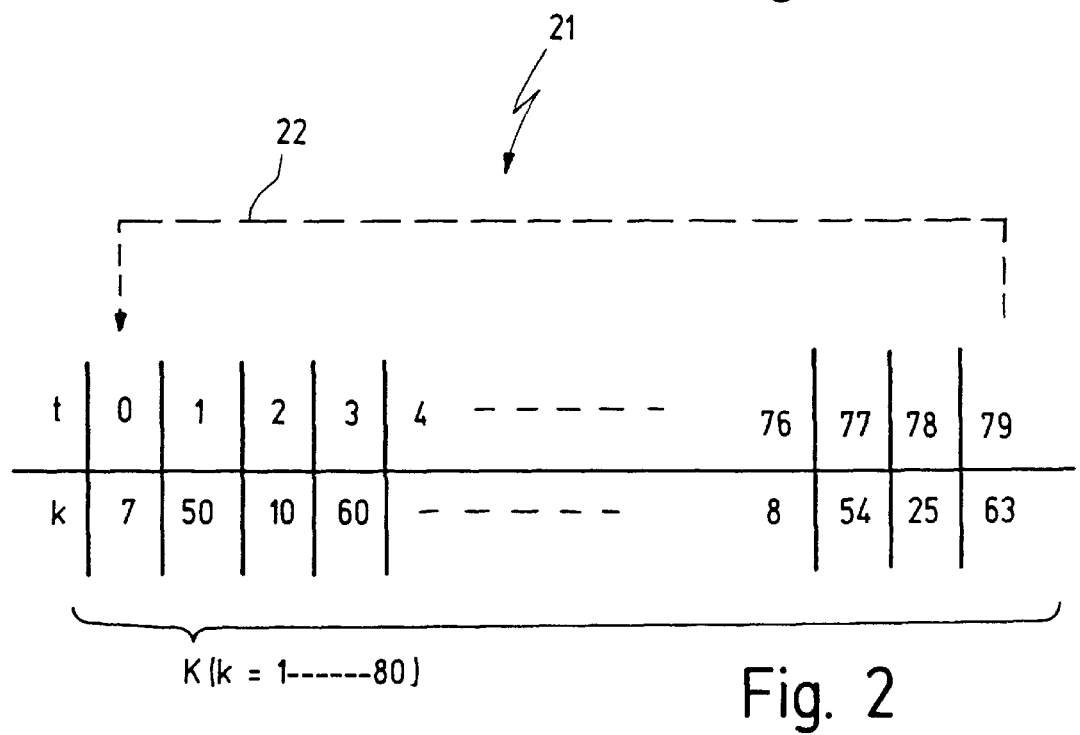
FIG. 2 shows a schematic example of a frequency-hopping pattern used by the network of FIG. 1.

Network 10 uses for data transfer the channels of a frequency spectrum (described in more detail in conjunction with FIG. 3) with the frequency-hopping method. To this end, a frequency-hopping pattern 21 shown in FIG. 2 is stored both in central station 11 and in each of user stations 12, 13, 14, 15, and is cycled through as indicated by arrow 22.

In the example shown, a set K(k=1 to 80) of 80 channels is arranged, statistically distributed, in frequency-hopping pattern 21 in such a way that the greatest possible spacing exists between the phases of two successive channels K(k), so that interference due to multiple reflections which may occur on the one channel is avoided on the next channel with high reliability.

Network 10 operates with a system time which defines successive time slots, a data transfer between central station 11 and one of user stations 12, 13, 14, 15 occurring in each time slot over the respective valid channel. For example, transfer occurs over channel 7 in the time slot at time t=0, while transfer occurs over channel 54 in time slot t=77.

Frequency-hopping pattern 21 is cycled through so that time slot t=79 is once again followed by time slot t=0. The particular user station 12, 13, 14, or 15 for which a transmission of central station 11 is intended is governed by an address that central station 11 prefixes to the data packet for transmission in the respective time slot. In other words, while the system time (by way of the time slot) determines the particular channel to be used, central station 11 indicates the addressee during the data transfer. Moreover, information is provided during that data transfer as to which user station 12, 13, 14, 15 obtains transmission authorization in the next time slot. The channel of the next time slot is determined by frequency-hopping pattern 21 of FIG. 2.

In addition to its respective data packets, user stations 12, 13, 14, 15 also convey to central station 11 information regarding the number of data packets still to be transferred, so that central station 11 can grant transmission authorization on a load-dependent basis. To ensure that a user station 12, 13, 14, 15 with a high data volume does not completely exclude the other user stations 13, 14, 15, 12 from transferring, transmission authorization is granted not solely on the basis of data volume but also in accordance with how much time has elapsed since the last data transfer by the particular user station 13, 14, 15, 12.

Network 10 thus makes possible an asynchronous, load-dependent transfer of data packets, the data throughput being optimized by hierarchical allocation of transmission authorizations.

Network 10 described so far does not, however, operate in one exclusive frequency range; it is rather an auxiliary network that is overlaid on an existing network, as will now be described with reference to FIG. 3.

Figure 3:
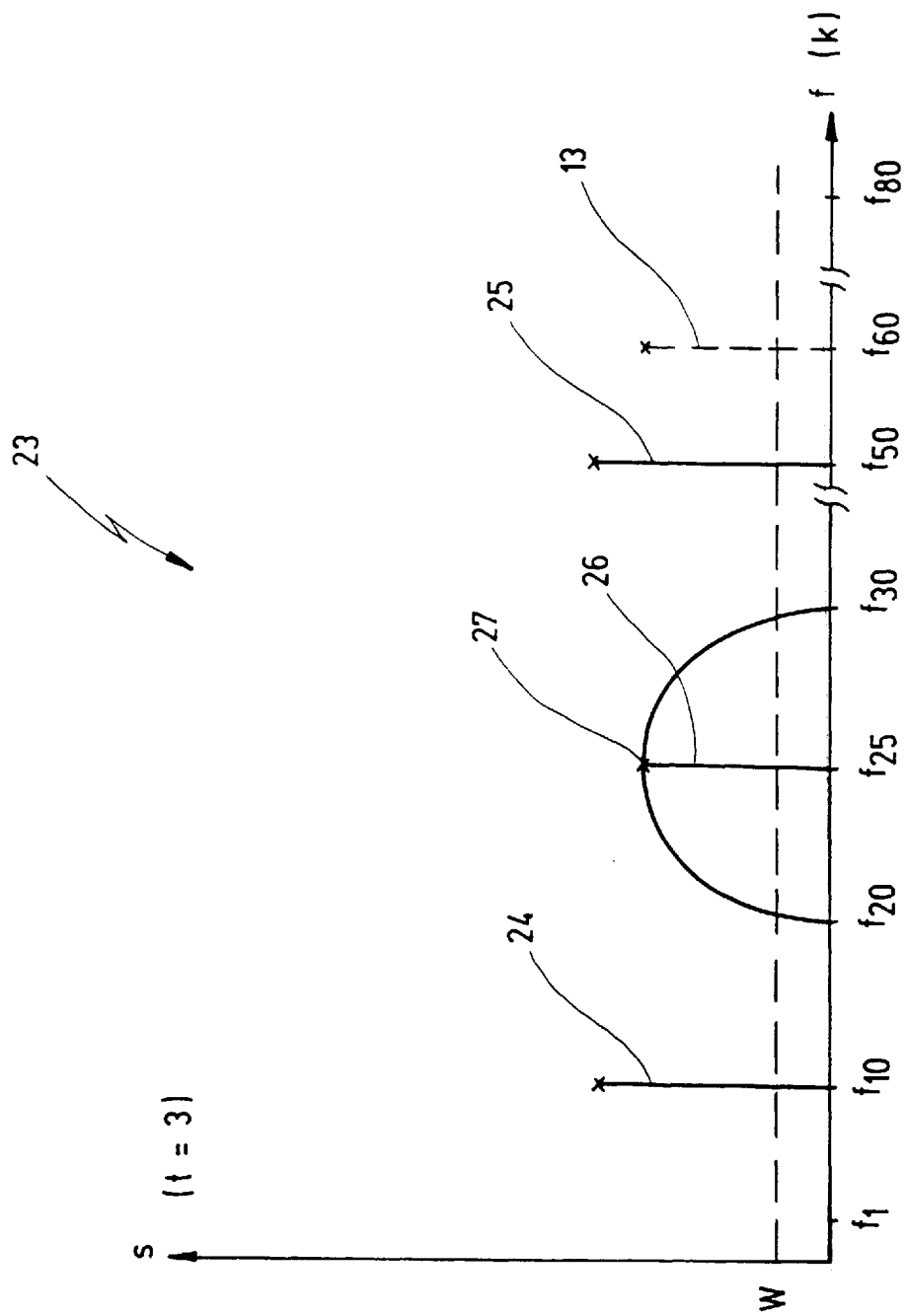
FIG. 3 shows a schematic example of a frequency spectrum of a basic network onto which the network of FIG. 1 is overlaid.

FIG. 3 schematically shows a frequency spectrum 23, used by primary users, that is also used by the user stations of the network of FIG. 1 as a kind of "auxiliary network." The frequency spectrum comprises, for example, f(k) channels $f_1$ to $f_{80}$; at $f_{10}$ and $f_{50}$ a primary user 24, 25 is transmitting, while user station 13 is located at $f_{60}$. The auxiliary network is therefore operating currently at system time t=3.

In addition to the very narrow-band primary users 24, 25 and user station 13, a further primary user 26 is also present, the center frequency of which is located at $f_{25}$. This primary user 26 is, however, extremely broad-band, and has a spectral bell curve 27 extending from $f_{20}$ to $f_{30}$. In the edge regions of this bell curve, however, i.e. above $f_{20}$ and below $f_{30}$, transmission energy S of primary user 26 is so low that it falls below a detectable threshold W, so that a user station would not be able to receive a signal on, for example, channels $f_{21}$ or $f_{29}$, and would therefore consider those channels unoccupied.

As already mentioned, the user stations use channels $f_1$ to $f_{80}$ for data transfer using frequency-hopping technology, such that in order to prevent disruption of primary users, at the beginning of each potential data transfer a check is made as to whether the particular frequency channel currently selected is occupied by primary users. The basic method is described in detail in DE 44 07 544 A1 mentioned earlier, so that further explanations is unnecessary here.

At each point in time, a transmitting or receiving user station therefore knows the channel over which that transmission is to occur. To ensure that this potential transmission does not disrupt a primary user, prior to transmission of a data packet in the particular time slot a check is made as to whether the selected channel is currently occupied by a primary user. The individual operations required for this purpose will now be discussed with reference to the schematic representation in FIG. 4.

Figure 4:
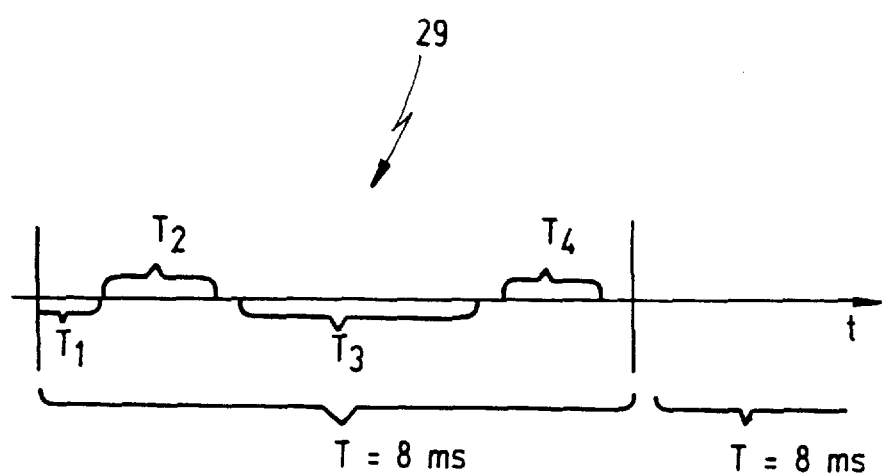
FIG. 4 shows how a time slot of the network of FIG. 1 is distributed among the various operations.

FIG. 4 shows, on the time axis, a schematically indicated time slot 29 of T=8 ms. At the beginning of this time slot 29, the user station's transmitter is first set to the selected channel; this takes place during time period $T_1$=50 ns.

The occupancy status of that channel is then interrogated during time period $T_2$=500 µs. If the channel is unoccupied, a data packet is then transferred during time period $T_3$ which is adjacent (although not directly) to $T_2$; 4 ms are available for this. This data packet consists in known fashion of a header, a data packet, and a trailer.

After transfer of the data packet, there is still a certain waiting period at $T_4$ for the receiver to confirm receipt of the data packet. If this confirmation arrives, the next data packet is transferred in the next time slot; if there is no confirmation, the same data packet is transferred once again in the next time slot.

If it is found, during the check in $T_2$, that the selected channel is already occupied by primary users, the remainder of the time in the time slot elapses unused, and the operations just described begin again at the start of the next time slot.

Network 10 of FIG. 1 as described so far is capable of adapting itself to varying load conditions, this being achieved by asynchronous transfer of data packets with load-dependent allocation of transmission authorization by central station 11. Since the data packets are transferred in temporally asynchronous fashion, a voice transfer is initially not possible due to stutter effects, which occur because the time intervals in which the data packets are transferred can vary greatly depending on the network load condition.

This can be remedied, however, on the one hand by the fact that central station 11 which must transfer voice to a user station 12, 13, 14, 15 allocates a fixed time grid of periodically arranged time slots in which it can transfer voice. The other time slots continue to be distributed to the user stations dynamically, i.e. as a function of data volume.

The permanently defined time slots are, however, in some circumstances by no means always used by the voice-transmitting user station, so that these time slots may still be lost for data transfer. Specifically, during pauses in conversation the user station does not transmit, so that other, asynchronous data could be transferred. Central station 11 has, however, no information available to it about this fact, so that the time slot elapses unused.

Of course it is possible, by exchanging corresponding information between central station 11 and the respective user stations 12, 13, 14, 15, to ensure that an unused time slot of this kind is still available for asynchronous data transfer, but the complexity in terms of coordination required for the purpose can be very great, particularly if the total data throughput through the network is very high, so that central station 11 must expend much of the available calculation time for data traffic.

Figure 5:
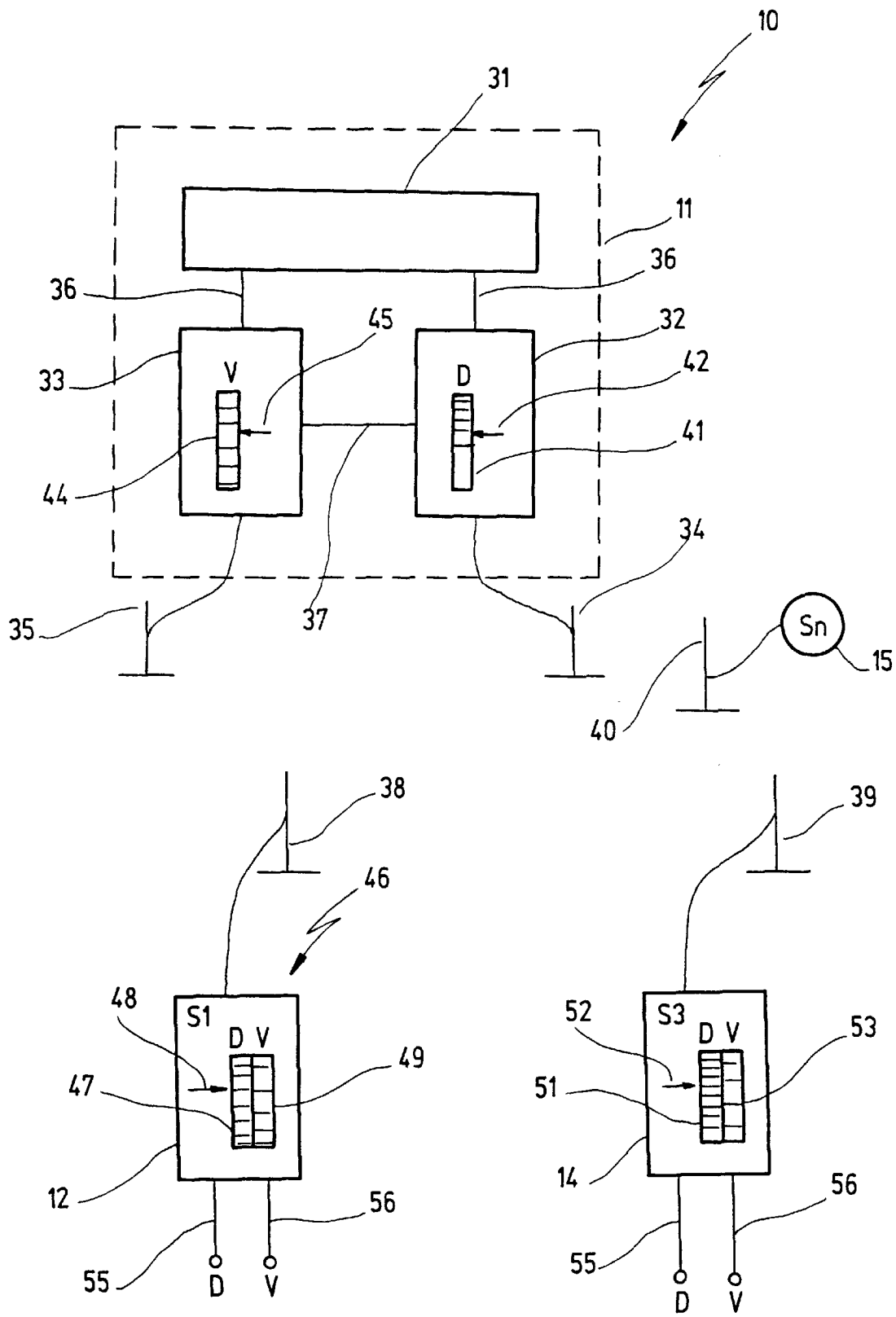
FIG. 5 shows a detailed representation of several user stations of the network of FIG. 1.

For this reason, in an alternative configuration of the invention, a further synchronous data network, which follows a frequency-hopping pattern that is orthogonal to the frequency-hopping pattern for asynchronous data transfer, is laid out between user stations 11, 12, 13, 14, 15 of network 10 of FIG. 5. This is achieved by the fact that central station 11 and user stations 12, 13, 14, 15 process both frequency-hopping patterns, as will now be described with reference to FIG. 5.

Central station 11 has a control unit 31 as well as two transmission/reception sections 32 and 33. Associated with each transmission/reception section 32, 33 is a transmission and reception antenna 34, 35. Transmission/reception sections 32 and 33 are connected to control unit 31 via data lines 36, and to one another via a data line 37. Central station 11 can also comprise two central stations of the type provided for operation of a network that processes only one frequency-hopping pattern.

The user stations, of which stations 12, 14, and 15 are shown in FIG. 5, also have transmission and reception antennae 38, 39, 40, by means of which they communicate with central station 11.

Transmission/reception section 32 of central station 11 manages a frequency-hopping pattern 41 by means of a pointer 42 that, controlled by the system time common to network 10, moves to one time slot after another, whereupon transmission/reception section 32 then sets itself to the channel that is assigned in frequency-hopping pattern 41 to the current time slot, and a data packet is transferred if the channel is not occupied by a primary user. This operation is referred to hereinafter as "processing a frequency-hopping pattern."

In corresponding fashion, transmission/reception section 33 processes a frequency-hopping pattern 44 using a pointer 45.

While frequency-hopping pattern 41 is thus used for asynchronous data transfer, as has already been described in conjunction with frequency-hopping pattern 21 of FIG. 2, frequency-hopping pattern 44 is used, in a manner yet to be described, for synchronous data transfer, e.g. for voice transfer.

User station 12 (S1) processes, with its transmission/reception section 46, a frequency-hopping pattern 47 using a pointer 48. This frequency-hopping pattern 47 is associated with the asynchronous frequency-hopping pattern 41 of the central station. In addition, user station 12 processes, in a manner yet to be described, a frequency-hopping pattern 49 that is associated the asynchronous frequency-hopping pattern 44 of central station 11.

In the same manner, user station 12 also comprises an asynchronous frequency-hopping pattern 51 that is processed by means of a pointer 52, as well as a synchronous frequency-hopping pattern 53.

The two user stations 12, 14 are equipped with an offline data connection 55 and with an online voice connection 56.

Frequency-hopping patterns 41, 47, 51 are identical to one another, and pointers 42, 48, 52 proceed synchronously with one another from time slot to time slot. The channel over which central station 11 and user stations 12, 14 can communicate with one another is therefore precisely defined for each time slot. Central station 11 decides, on a load-dependent basis, which user station (12 or 14) actually receives a transmission authorization or is addressed by central station 11.

Frequency-hopping patterns 44, 49, and 53 are also identical to one another, although transmission authorization is granted statically. This means that at a very specific time slot, only one very specific user station can transmit or receive over the channel from frequency-hopping pattern 44, 49, 53. So long as user station 12 or 14 has no need to transmit/receive, however, it processes asynchronous frequency-hopping pattern 41, 47, 51. Not until data are pending at its connection 56, or central station 11 has reported over a channel from the first frequency-hopping pattern that voice data are ready for reception, does the respective user station 12 or 14 switch over solely to the allocated time slots in the second frequency-hopping pattern.

The way in which this takes place will now be shown with reference to FIG. 6.

In FIG. 6, some of the time slots t are shown in the top row. The following rows show the frequency-hopping pattern for voice transfer of user station 12 (S1V), the frequency-hopping pattern for asynchronous data transfer of user station 12 (S1D), the frequency-hopping pattern for voice transfer of user station 14 (S3V), and the frequency-hopping pattern for asynchronous data transfer of user station S3D). In the interest of clarity, the individual channels located in the respective time slots of the frequency-hopping patterns were not indicated; an "x" simply indicates which user station is authorized to transmit, over which frequency-hopping pattern, in the particular time slot.

It is evident that frequency-hopping patterns S1V and S3V grant transmission authorization at equidistant intervals. For example, user station 12 can transfer voice in time slots 0, 10, 20, etc., while user station 14 (S3V) can transfer voice in time slots 5, 15, 25, etc. The equidistant intervals can also, if necessary, be granted differently; this allocation can either take place when the network is configured or be modified dynamically during operation.

The frequency slots in the asynchronous frequency-hopping patterns S1D and S3D are distributed in load-dependent fashion and accepted at random.

Thus in time slot t=0, user station 12 is transferring voice, while in time slot t=5 user station 14 is transferring voice. For this time slot, user station 12 has a transmission authorization in the asynchronous frequency-hopping pattern S1D. This means that at time slot t=5, user station 12 is transferring data, and user station 14 voice, to central station 11. Central station 11 receives both data packets with its two transmission/reception sections 32, 33, but processes only the synchronous data packet in control unit 31, since it has priority. At the end of this time slot t=5, the central station confirms receipt of the voice data packet to user station 14, while user station 12 remains without confirmation so that it sends out the asynchronous data packet again in time slot 17.

A similar collision occurs in time slot t=10, where the voice transmission of user station 12 has priority over the data transfer of user station 14.

In time slot t=20, user station 12 has both a transmission authorization for voice and a transmission authorization for data. If no voice traffic needs to be carried out, user station 12 will transfer asynchronous data; otherwise, however, it will transfer synchronous voice data. A similar situation also exists in time slot t=25.

The time slots in FIG. 6 that have no "x" in them are assigned to other user stations, which for the sake of clarity are not shown in this Figure.

Of course user stations 12, 14 process frequency-hopping patterns S1V or S3V only if an asynchronous data transfer is actually necessary; otherwise there is no switchover to the frequency-hopping pattern for synchronous data transfer.

We claim:

1. A method for transferring data packets in a network of user stations, the data packets being transferred over a set of channels with a frequency-hopping method and the channels being in this context selected for data transfer in accordance with a frequency-hopping pattern in temporally successive time slots, and there being assigned to a user station time slots in which it is authorized to transmit as needed, wherein in a first frequency-hopping pattern, data packets are transferred as needed, and in at least one second frequency-hopping pattern orthogonal to the first frequency-hopping pattern, data packets are transferred in a redefinable time grid, synchronously in the network, and wherein each user station has a transmission/reception section that is set alternatively on a channel from the first or the second frequency-hopping pattern.

2. The method of claim 1, wherein at least a first, fixed time grid of periodically arranged time slots is assigned to a user station for synchronous transfer of data packets, and at least some of the remaining time slots are allocated dynamically to the user stations as a function of their data volume.

3. The method of claim 1, wherein the set of channels lies in a frequency band that is used by primary users, such that before a potential data transfer, a particular channel selected by the network of user stations is checked to determine whether a primary user is occupying that channel at the time, and as a function of that check either a data packet is transferred over the selected channel, or the next channel in the particular frequency-hopping pattern is selected for checking and potential data transfer.

4. The method of claim 1, wherein the time slots of the first frequency-hopping pattern are dynamically allocated to the user stations as a function of their data volume.

5. The method of claim 1, wherein the network of user stations has a common system time, and processes both frequency-hopping patterns cyclically and simultaneously in such a way that in one specific time slot, one channel each from the first and second frequency-hopping patterns is available for data transfer.

6. The method of claim 1, wherein fixed, periodically arranged time slots are allocated to each user station in the second frequency-hopping pattern.

7. The method of claim 1, wherein a set of fixed, periodically arranged time slots in the second frequency-hopping pattern is allocated to a user station as needed.

8. The method of claim 1, wherein one user station is a central station that has two transmission/reception sections, of which, in a specific time slot, the one is set on the assigned channel of the first frequency-hopping pattern and the other is set on the assigned channel of the second frequency-hopping pattern.

9. The method of claim 1, wherein the user station follows the first frequency-hopping pattern, and switches over to the second frequency-hopping pattern only when it has its own transmission authorization.

10. The method of claim 9, wherein the user station switches over to the second frequency spectrum only if a synchronous data transfer for it is pending.

11. The method of claim 10, wherein the central station informs the user station of a synchronous data transfer over a channel from the first frequency-hopping pattern.

12. A central station for a network of user stations which transfers data packets, such that the data packets are transferred over a set of channels with a frequency hopping method and the channels are in that context selected for data transfer in accordance with a frequency-hopping pattern in temporal succession, the central station having a first transmission/reception section which processes a first frequency-hopping pattern in order to transfer data packets in load-dependent fashion to/from the user stations and a second transmission/reception section that processes, approximately simultaneously, a second frequency-hopping pattern, orthogonal to the first frequency-hopping pattern, in order to transfer data packets in a predefinable time grid.

13. The central station of claim 12, which is equipped to transfer data packets over a set of channels which lies in a frequency band that is used by primary users, such that before a potential data transfer, a particular channel selected by the network of user stations is checked to determine whether a primary user is occupying that channel at the time, and as a function of that check either a data packet is transferred over the selected channel, or the next channel in the particular frequency-hopping pattern is selected for checking and potential data transfer.

14. A user station for a network of such user stations which transfers data packets, such that the data packets are transferred over a set of channels with a frequency-hopping method and the channels are in that context selected for data transfer in accordance with a frequency-hopping pattern in temporal succession, such that the user station is equipped to store a first frequency-hopping pattern and process it as specified by a central station, wherein the user station is equipped to store two frequency-hopping patterns and call them up selectively in order to transfer a data packet, data packets being transferred in load-dependent fashion in the first frequency-hopping pattern and data packets being transferred in a predefinable time grid in the second frequency-hopping pattern orthogonal to the first.

15. The user station of claim 14, which is equipped to transfer data packets over a set of channels which lies in a frequency band that is used by primary users, such that before a potential data transfer, a particular channel selected by the network of user stations is checked to determine whether a primary user is occupying that channel at the time, and as a function of that check either a data packet is transferred over the selected channel, or the next channel in the particular frequency-hopping pattern is selected for checking and potential data transfer.

* * * * *